Figure 5:
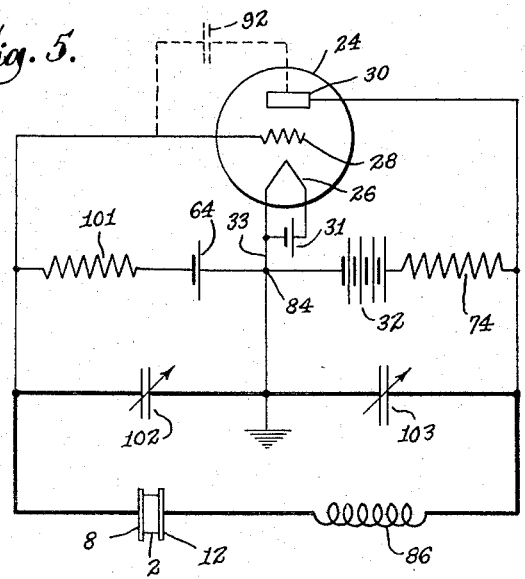

Aug. 27, 1935.    J. K. CLAPP    2,012,497
ELECTRICAL SYSTEM
Filed March 11, 1933    2 Sheets-Sheet 1
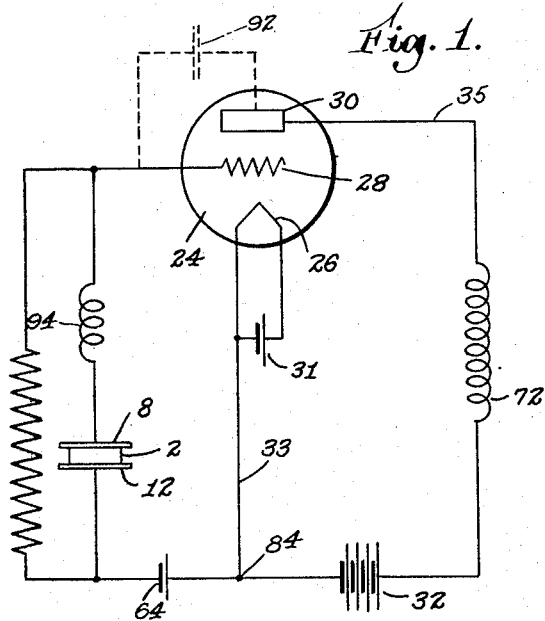
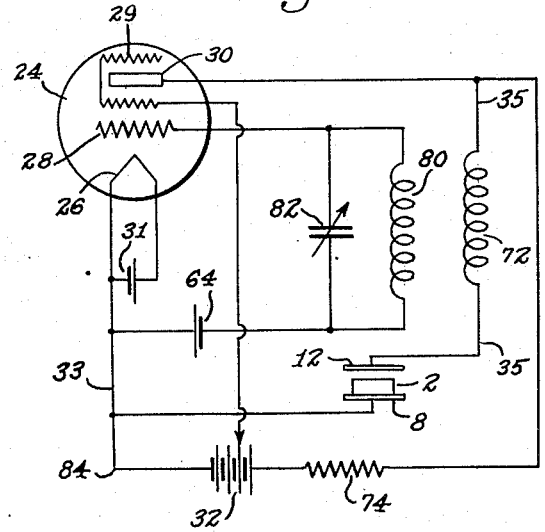
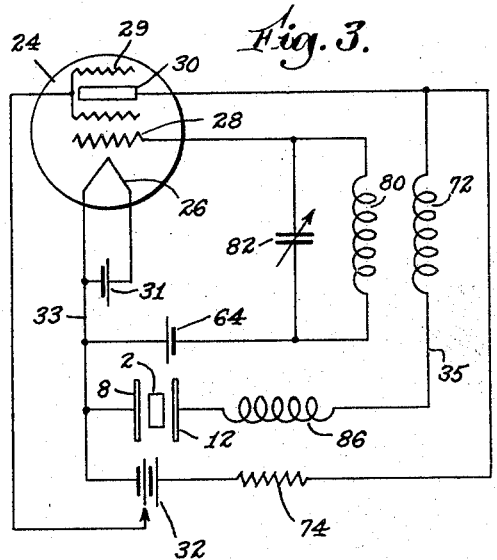
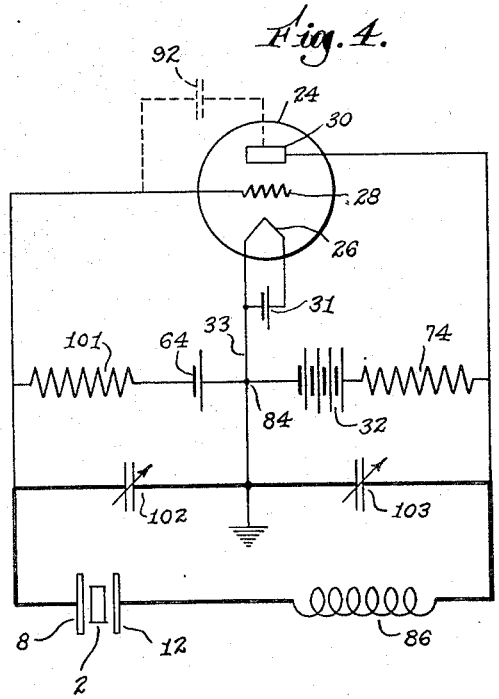
Inventor
James K. Clapp
by David Rines
Attorney Aug. 27, 1935.  J. K. CLAPP  2,012,497
ELECTRICAL SYSTEM
Filed March 11, 1933   2 Sheets-Sheet 2

Inventor
James K. Clapp
by David Rines
Attorney

Patented Aug. 27, 1935

2,012,497

UNITED STATES PATENT OFFICE 2,012,497

ELECTRICAL SYSTEM

James Kilton Clapp, Auburndale, Mass., assignor to General Radio Company, Cambridge, Mass., a corporation of Massachusetts Application March 11, 1933, Serial No. 660,419

19 Claims. (Cl. 250—36)

The present invention relates to electrical systems, and more particularly to oscillatory systems employing electromechanical vibrators, such as piezo-electrical crystals. The present application is a continuation in part of application Serial No. 551,665, filed July 18, 1931.

Piezo-electric crystals execute mechanical vibrations under vibratory electrical stimulus and, conversely, develop electrical potentials as a result of mechanical vibrations. They have, in general, a plurality of particular modes or periods of mechanical vibration, of different frequencies. A relatively small number of these modes are more or less dominant, and a very much larger number are subsidiary. The longitudinal and the transverse modes of vibration of lowest or gravest frequencies, for example, are dominant modes. In order to avoid circumlocution of language, these dominant modes of vibration, together with their overtones or harmonics, will be referred to, in the specification and the claims, as the natural or the resonant frequencies of the crystal.

When an oscillatory circuit is under the control of a piezo-electric crystal, it oscillates at a frequency substantially equal to the frequency of one of these natural or resonant frequencies. Heretofore, however, the frequency of the oscillations has not been exactly equal to the natural crystal frequency, and the prior-art systems are not capable of operation at these natural frequencies.

An object of the present invention is to provide a new and improved electromechanical oscillatory system the frequency of the oscillations of which shall exactly, or within exceedingly small limits,—as small as may be desired, and smaller than has ever been the case heretofore,—be equal to a natural frequency of mechanical vibration of the crystal.

One reason for the failure of the prior-art oscillatory circuits to oscillate at the resonant frequency of the crystal has been due to the presence of a gap between the crystal and its electrodes, and another object of the invention, therefore, is to compensate for the effects of the capacitance of this gap. There are, however, other disturbing capacitances in the circuit, such as the effective capacitative reactances between the grid, the filament and the plate or other electrodes of the vacuum tube connected in the circuit. Though the effects of these other capacitances are minor in magnitude compared with the effect of the capacitance of the crystal gap, they may prove to be quite serious under circumstances where they are the effects of the only residual capacitances left in the circuit, as when the crystal electrodes are silvered to the crystal faces, so that there is no crystal gap. A further object of the invention, therefore, is to compensate for the effective reactance of the circuit as a whole, including the vacuum tube or tubes.

When the crystal vibrates at its natural or resonant frequency in a circuit controlled by the crystal, the circuit oscillates very freely, and a further object of the invention, accordingly, is to provide a new and improved freely oscillatory system of the above-described character.

A further object is to provide a new and improved oscillatory circuit of very great stability of frequency, for use wherever such stability is desirable, as in connection with wave or frequency standards.

Other and further objects will be explained hereinafter and will be particularly pointed out in the appended claims.

Figure 6:
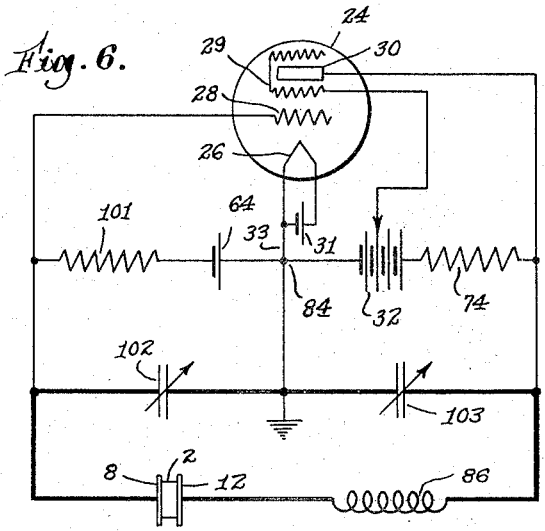
Figure 7:
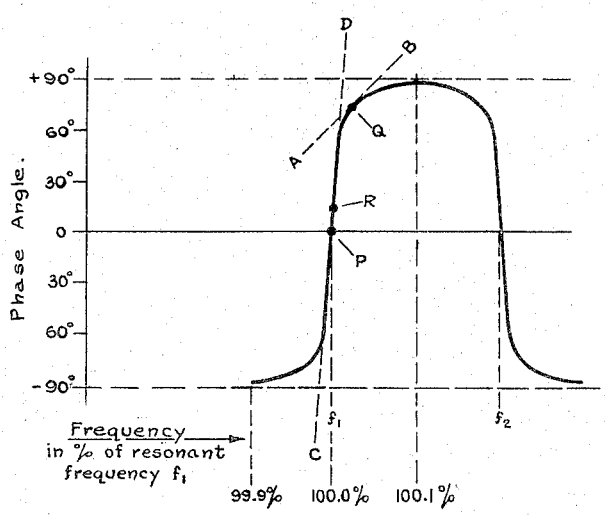

The invention will now be described in connection with the accompanying drawings, in which Fig. 1 is a diagrammatic view of circuits and apparatus illustrating one arrangement according to the present invention; Figs. 2 to 6 are views of further embodiments; and Fig. 7 is a plot of a phase-shift curve, illustrating the operation of circuits embodying the present invention.

The preferred form of electromechanical vibrator is illustrated as a piezo-electric-crystal plate 2, adjacent to the opposite sides or surfaces of which are positioned opposed conducting electrodes, terminals or plates 8 and 12 by means of which the vibrator is adapted to be connected in an electric circuit. The electrodes 8 and 12 are preferably disposed substantially perpendicular to an electric axis of the crystal. In Figs. 1, 5 and 6, the electrodes 8 and 12 are shown in intimate contact with the crystal. This may be brought about by silvering, by chemical deposition, or in any other desired way. In Figs. 2, 3 and 4, on the other hand, one or both electrodes 8 and 12 is or are shown separated from the crystal, so as to provide a gap. It will be understood that the illustrated arrangements are not exclusive, and that the crystal-electrode arrangement illustrated in any of these figures may be used in any other. Figs. 4 and 5, for example, illustrate the same circuit, except that, in Fig. 4, there is a gap between the crystal and one or both electrodes 8 and 12, but in Fig. 5, there is no such gap.

A vacuum tube 24 is diagrammatically shown in Figs. 1, 4 and 5 provided with three sensitive elements or electrodes, namely, a filament 26, a grid 28 and a plate 30. This, however, is for illustrative purposes, as the vacuum tube may have additional elements or electrodes, such as the screen-grid electrode 29 of Figs. 2, 3 and 6. The filament 26 is connected with a filament-heating battery 31. The external input or grid circuit may be defined as the circuit between the filament 26 and the grid 28 that is external to the tube 24. The internal input circuit is the circuit between the filament 26 and the grid 28 inside the tube 24. (In Figs. 2 and 3, the external input circuit is shown comprising, also, a winding 80 shunted by a tuning condenser 82.) In Fig. 1, the external plate or output circuit extends from the filament 26, by way of a conductor 33, to a terminal 84; and from the terminal 84, through a plate battery 32, by way of a conductor 35, and through an output winding 72, to the plate 30. The internal output circuit is wholly in the tube, between the filament 26 and the plate 30. In Figs. 2 and 3, the external output circuit is shown containing also a resistor 74 in series with the battery 32, the conductor 35 and the winding 72 being in a branch circuit. When the terms "input circuit" and "output circuit" are employed hereinafter, in the specification and the claims, the corresponding external circuits will be referred to, except where the internal circuits are specifically designated. In all cases, the purpose of the element 74 is to diminish the radio-frequency current flowing through the battery circuit. This element also serves to reduce the possibility of the circuit operating at extraneous or spurious frequencies. The windings 80 and 72 are inductively coupled in Figs. 2 and 3, but not so in Fig. 1, which represents one form of Pierce circuit. The winding 72 of Fig. 1 may be shunted by a tuning condenser (not shown).

In the Pierce circuit of Fig. 1, the crystal 2 is shown disposed in the input circuit. In Figs. 2 and 3, however, the crystal is disposed in the said branch of the output circuit, in parallel with the plate battery 32 and element 74.

The tuning input condenser 82 of Figs. 2 and 3, or the corresponding tuning output condenser (not shown) of Fig. 1, in parallel to the winding 72, may be so appropriately adjusted, and the parameters of the circuits so chosen, that the current in the winding 72 of the plate or output circuit of the tube shall be a maximum at a natural frequency of the piezo-electric vibrator. In the case of Figs. 2 and 3, a voltage will be induced in the winding 80. This voltage is impressed on the grid 28 and appears in amplified form in the output circuit. The system will then oscillate at and very near to the natural or resonant frequency of the crystal, with a frequency determined by that mode of vibration of the vibrator corresponding to the said natural or resonant frequency, though it will not oscillate in the absence of the crystal. The system will oscillate even though the parameters be varied within quite wide limits, and the frequency will be maintained substantially constant irrespective of variations in plate or filament voltage, load or other factors.

At and near the natural or resonant frequency of the crystal 2, its impedance is very low, and it behaves as an electric circuit of the series-resonant type, that is, as a pure resistance.

Since the crystal and output coupling coil 72 of Fig. 2 are in series, the current in the coil and the current through the vibrator are one and the same. Since feedback is produced by the current in the coupling coil, acting through the mutual inductance to the grid circuit, and as this current is the crystal current, the feedback must evidently depend on the current through the crystal. The impedance in series with the battery provides no path through the coupling coil, so current in this impedance cannot introduce a voltage into the grid circuit by virtue of the mutual inductance. Furthermore, the crystal being of low impedance under the conditions of operation, the voltage across the series impedance is low. This, combined with the fact that a screen-grid tube is used to reduce the capacity coupling between the grid and the plate, reduces the transfer of voltage to the grid circuit by way of the tube, grid-to-plate capacity. As the reduction is considerable, however, the feedback takes place substantially through the mutual inductance only that is provided for that purpose, and depends on the current through the vibrator.

According to the arrangement of the elements illustrated in Fig. 2, therefore, when the reaction of the crystal 2 is purely resistive, the feedback voltage, being made dependent wholly upon the current through the crystal, is not dependent on the voltage developed across the crystal and its air-gap capacity.

If there were no impedance 74 in series with the battery 32, the crystal would be short-circuited and the system would be inoperative. Some impedance is, therefore, used to reduce the radio-frequency current flowing through the battery circuit, and this impedance 74 is chosen sufficiently large so that the radio-frequency current through it is small in comparison with that through the crystal. This impedance is, however, much lower than that employed in other circuits; that is, it is much lower than the value required to produce oscillations by the feedback of energy from the output circuit to the input circuit by way of the plate-grid capacity of the tube. The impedance in the output circuit is very low, compared with the internal plate resistance of the tube, and of only a very few hundred ohms, at the resonant frequency of the crystal, at which frequency the system oscillates, feed-back being obtained through the mutual inductance, or magnetic feed-back.

If the system were arranged with the crystal in series with the source, and shunted by a high-impedance path (for the plate current of the tube), there would be two possible conditions of operation; first, the output impedance would be a minimum, as previously described, and oscillation would be obtained by virtue of the magnetic feed-back; and, secondly, the frequency of oscillation would change so that the output impedance would be very high, giving low output current, but high output voltage; feed-back would then take place through the grid-plate capacity of the tube whether or not a screen-grid tube were used. By making the impedance shunting the crystal so low that this second condition of oscillation cannot be maintained, operation is insured to be in the desired manner, as described. For example, the resistance of the crystal may be 400 ohms and the impedance of the resistor 74 may be 1,000 ohms.

An inductor 86 is shown, in Fig. 3, inserted in series with the coupling inductor 72, in series with the crystal, and in parallel to the battery 32 and the resistor 74. This inductor 86 is of such reactance as to produce series resonance at the natural crystal frequency with the capacitance of the gap, the inductance 86, in general, being much greater than the coupling inductor 72.

The impedance 86 may be a variable inductance, such as a variometer, a fixed coil, or a combination of inductance and capacitance of values such as to yield the desired effective inductance. When the gap is not appreciable, this inductance may, for some purposes, be omitted.

The effect of the capacity of the gap between the crystal 2 and its electrodes on the frequency of the system is thus neutralized.

There are several advantages resulting from this arrangement. First, a greater amplitude of oscillation is thus rendered possible; secondly, the system will oscillate at a frequency that exactly, or within as very small limits as may be desired, is the same as the natural or resonant frequency of the crystal; thirdly, the frequency stability, or the degree of control of frequency by the crystal, is greatly improved; and fourthly, it is found that when the crystal is operated at or very near to its natural, resonant frequency, the changes of frequency, with variations in temperature, are smaller than in present-day systems. The two last-named advantages render the oscillator particularly advantageous for use in frequency standards. The third advantage may be made more clear by referring to the phase-shift curve of Fig. 7, where $f_1$ represents the point corresponding to series resonance in the quartz and $f_2$ the point corresponding to shunt resonance in the quartz. The abscissa represents frequency in per cent of the resonant frequency $f_1$, and the ordinate the phase angle of the series-resonant element. The frequency of the oscillations, under the conditions described, corresponds to operation at the point P, where the curve is steepest, corresponding to a zero phase angle and series resonance in the crystal 2. The frequency usually resulting with present-day oscillators corresponds to operation in the region of a point such as Q, Fig. 3, corresponding to between 70 and 90 degrees phase angle. If there is any tendency for the system to depart from the above-described ideal conditions, the crystal, owing to the position of the point P, is able to overcome the changed conditions with a very much smaller change of frequency of the system than is true at the point Q. As is clear from the curve, the permissible range of phase angle may be as great as about 45 degrees.

Further discussion of this phase-shift curve will be found hereinafter.

The discussion heretofore has been upon the supposition that the feed-back between the output and input circuits is wholly inductive, and effective through the windings 72 and 80. As a matter of fact, ordinary vacuum tubes have also a capacity feed back between their plates 30 and their grids 28, as indicated in dotted lines, in Figs. 1, 4 and 5, by the condenser 92. The effect of this plate-to-grid-capacity feed back is to produce, in the output circuit, an undesired shift in the phase of the current with respect to the output voltage, and this would prevent the system from operating at the true resonant frequency of the crystal. The capacity feed back depends on the voltage developed across the plate-load impedance, which is here very low, while inductive feed back depends on the current through the plate-load impedance, which is here high and which is directly dependent upon the performance of the crystal. The feed-back is consequently practically dependent upon the crystal performance, particularly for low frequencies. Different tubes would, however, introduce different capacity effects for the same crystal. At the lower frequencies, this is not serious. For other frequencies, however, of the order of several hundred kilocycles and higher, the effect of the plate-to-grid capacitance may be neutralized or eliminated, in any desired way. In Figs. 2 and 3, this is illustrated as effected by using a screened-grid tube, the screening element of which is shown at 29, greatly to reduce, rather than to neutralize, the capacity feed back. Provision is made, as already explained, to provide magnetic feed back controlled by current through the crystal, instead of capacity feed back.

But vacuum tubes have also other effective capacitative reactances than the reactance indicated by the condenser 92 in Figs. 1, 4 and 5. There are, for example, additional capacitances between the filament 26 and the grid 28 and between the filament 26 and the plate 30.

The circuits have also other capacitative reactances of small order of magnitude. Where a gap between the crystal 2 and its electrodes 8 and 12 is provided, as in Figs. 2, 3 and 4, the reactance of this gap is sufficiently great so that the disturbing effects produced by these other capacitances are entirely negligible by comparison. Where there is no such gap, as in Figs. 1, 5 and 6, however, it is necessary greatly to reduce, or neutralize, the effects of these additional reactances before the crystal can vibrate at a natural or resonant frequency without interference from the other electrically disturbing effects of the circuit.

In all cases, it will be noted, series resonance is produced with the effective reactance of the circuit as a whole, including the crystal gap, if any, and the effective tube reactance.

To illustrate this, reference may now be made to Fig. 1, disclosing a Pierce circuit of the type in which the crystal 2 is connected between the filament and the grid, and in which, therefore, the reactances of the external input and output circuits are inductive when oscillations are produced. Since the input circuit must be inductive, and since the crystal acts as a pure resistance at series resonance, a further additional and relatively small inductance 94 is necessary to balance the other disturbing capacitative elements before described, thus to permit the system to oscillate. This inductance 94 should be equal and opposite to the effective series input capacity reactance between grid and filament of the tube, in order to produce series resonance.

If there were an air gap in series with the crystal, an additional inductance (not shown in Fig. 1, but shown in 86 in Fig. 3) would be necessary in order to produce series resonance with the air gap capacity of the crystal. Such additional balancing inductance is not necessary in Fig. 1, because there is no crystal air gap when the electrodes 8 and 12 are in intimate contact with the crystal.

In the case of Figs. 2 and 3, similarly, where the crystal 2 is connected between the filament and the plate, if there were no crystal air gap, the additional inductance (not shown) would be of such value as to produce series resonance with the effective series output reactance of the tube.

To employ general language, applicable to both the effective, series, input reactance and the effective, series, output reactance, the balancing inductance may be said to be of value such as to effect series resonance with the effective, series reactance of the tube and the circuit in combination; or, more simply, to effect series resonance with the effective, series reactance of the circuit, including the tube in this designation of "circuit".

Were the effective, series, input or output reactance inductive, instead of capacitative, as would be the case with circuits having other devices than vacuum tubes, or using other types of electromechanical vibrators, series resonance would be produced by adding a suitably valued capacitance instead of an inductance 86 or 94.

It will now be clear also that the invention is applicable to systems in which the crystal is connected otherwise than as is illustrated in Figs. 1, 2 and 3, as explained in the said application. In connection with Fig. 4 of the said application, for example, the conditions to be satisfied are that the inductive reactances in the grid and the plate circuits plus the capacity reactance of the crystal air gap (if there is one) are zero at the time that the reaction of the crystal becomes purely resistive. The system will then oscillate at the natural frequency of the crystal.

In the grid-plate-crystal-connected systems of Figs. 4, 5 and 6, as in the systems of Figs. 1, 2 and 3, there is the same fundamental objective of having the frequency of oscillation exactly the same as that of the natural resonance frequency of the crystal, or as near thereto as may be desired.

The systems of Figs. 4, 5 and 6 are preferred embodiments of modified Colpitts circuits, the former employing a three-element tube and the latter a four-element tube. In both circuits, the elements shown in heavy lines comprise the major frequency determining portion of the systems. The crystal is disposed in series with the coil 86, and both the crystal and the coil 86 in parallel with a tuning condenser 103 in the plate circuit and a condenser 102 in the grid circuit. The grid and the plate circuits are thus coupled by the coil 86 and the crystal. In the absence of the coil 86, therefore, these systems correspond to Colpitts oscillators, in which the inductance coil is replaced by the crystal.

In the absence of coil 86, the system operates at such a frequency that the inductive reactance of the crystal is equal and opposite to the sum of the reactances of the condensers 102, 103, including any modifications of these capacities due to the effective tube capacitances. By suitable choice of the values of the elements 102, 103, the effects of the variations in effective tube capacities may be made exceedingly small.

The stability of the system may be very greatly improved through the use of the coil 86, of suitable value, connected in series with the crystal. The value of inductance in coil 86 should be such as to give a reactance equal and opposite to the sum of the reactances of the condensers 102 and 103, including any modifications of these capacities due to the effective tube capacity. The term "resultant capacitance" or its equivalent will be employed to designate the reactance of the condenser 102 or 103 as so modified.

The corresponding conditions to be set up here, therefore, are that the reactances of the capacitances 102, 103, the inductance 86, and the capacitance of the crystal gap, if there is one, or of the corresponding reactance, if there is no air gap, shall be zero at the time that the reactance of the crystal becomes zero.

In the absence of coil 86, the system must here, too, operate at a frequency corresponding to a point such as Q, Fig. 7, where the inductive reactance of the crystal is large. The slope of the curve must be positive, as shown by the tangent line AB at the point Q, if the crystal is to exert stabilizing control on the frequency of the system. It is evident that, at the point Q, the slope of the curve is much less than at the point P, for example, corresponding to true resonance in the quartz. The slope at the point P is indicated by the tangent line CD, which is nearly vertical.

The point Q corresponds to conditions where the crystal must not only stabilize the frequency, but must, as has been the case heretofore, also furnish all the necessary inductive reactance for the functioning of the oscillator. The latter requirement has been detrimental to the best functioning of the crystal as a control or stabilizing element. According to the present invention, this requirement is more logically met by a circuit element, such as the coil 86, external to the crystal.

If the coil 86 is inserted, of proper value to give the necessary inductive reactance for the functioning of the circuit as a drive, then the crystal may be left free to operate solely as a control or stabilizing element, and under conditions where it may attain a far higher degree of control than in prior-art systems. These conditions are met when the coil 86 is given such a value that the frequency of operation of the system corresponds to the point P on the crystal phase-shift characteristic, corresponding to operation at the exact natural frequency of the crystal. It is evident, also, that, if the adjustment of the coil 86 is not exactly made to meet these conditions, but is adjusted so that operation takes place at a point such as R, corresponding to less than about 45 degrees, the control or stabilizing effect of the crystal is practically as good as at the point P, but the frequency of the system differs from the true resonant frequency of the crystal by only an exceedingly small amount, this difference being many times smaller than the difference represented in normal operation in all prior-art systems.

The system represented in Fig. 5 is subject to modifications in frequency of oscillation caused mainly by variations in the plate-filament and grid-filament resistances of the tube.

The embodiment indicated in Fig. 6 overcomes in a large measure the modifications produced by the variations in plate-filament resistance. This is because the plate-filament resistance of the screen-grid tube, employed as an amplifier, is many times higher than in three-element tubes, so that its effect on the frequency is greatly reduced and this plate-filament resistance is, furthermore, more nearly constant than in three-element tubes. The corresponding modifications caused by variations in grid-filament resistance may be entirely overcome by arranging the system so that at no time does grid current flow.

Though the circuit of the present invention is capable of operating at exactly the natural frequency of the crystal, it may not do so unless it is properly adjusted. Statements of the conditions to be met in the circuit in order to realize operation at exactly the natural frequency of the crystal, namely, that the reactance of the coil shall be equal and opposite to the reactance of the crystal air gap, assuming that the air-gap reactance is the largest disturbing factor, may be made, and be correct theoretically. These conditions may not necessarily, however, be met in practice. The Pierce circuit, illustrated in Fig. 1, for example, without the inductance 94, is incapable of operation at exactly the natural frequency of the crystal. The circuit disclosed, however, with a suitable value of the inductance 94, is capable of so operating.

For a given crystal, operating at a single frequency, the above conditions may be met experimentally. For crystal oscillators of very precise type, where accuracy and stability are paramount, this experimental adjustment of the system will readily be effected. A further advantage is gained by the use of the coil 86, or 94, since most of such oscillators are of low frequency, with a consequent emphasis on the effect of the air-gap capacity. When a given oscillator is to be used with many crystals, however, which requires the use of individual coils 86 and 94 for overcoming the individual air-gap reactances, commercial requirements may demand that the coil be sometimes omitted for some purposes. Under such circumstances, the frequency of operation will be near and very close to the exact natural frequency. In all cases, the frequency may be made as near to the exact natural frequency as may be desired by suitable choice of the inductance 86 or 94.

The present invention, therefore, provides an electric system comprising an electric circuit that is not, in itself, oscillatory in the absence of the vibrator, in combination with a vibrator, the connections being such that the resulting system may be operated at a frequency equal to the frequency of one of the modes of natural mechanical vibration of the vibrator, or as close thereto as may be desired.

One use of the invention as a wave standard has already been mentioned. It may be used also in many other applications, as in monitoring equipment for broadcasting stations, and it is particularly useful when high stability of frequency is required.

Other uses and applications and other modifications within the scope of the present invention will readily occur to persons skilled in the art. It is therefore desired that the above-described embodiments of the invention shall be regarded as illustrative of the invention, and not restrictive, and that the appended claims shall be construed broadly, except insofar as it may be necessary to impose limitations in view of the prior art.

What is claimed is:

1. An oscillatory system having, in combination, an electric circuit, a piezo-electric crystal having electrodes, there being a gap between the crystal and the electrodes, means for connecting the electrodes with the circuit, and an additional inductance in series with the gap, the additional inductance and the capacity of the gap being in series resonance at the frequency of the mechanical vibrations of the crystal.

2. An oscillatory system having, in combination, an electrical device having an internal capacity, an input circuit and an output circuit therefor inductively coupled together, an inductance in the output circuit, an electromechanical vibrator, and means connecting the electro-mechanical vibrator only in the output circuit in series with the inductance, the output circuit having an impedance of value so low as to be insufficint for the production of oscillations by the feed-back of energy from the output circuit to the input circuit by way of the internal capacity of the electrical device.

3. An oscillatory system having, in combination, a vacuum tube having a filament, a grid and a plate, an input circuit in which the filament and the grid are connected, an output circuit in which the filament and the plate are connected, the input and the output circuits each having a winding, the windings being coupled together, a source of energy in the output circuit, an alternating current impedance in series with the source, the alternating-current impedance being relatively low compared with the alternating-current, internal plate resistance of the tube, and an electromechanical vibrator, the vibrator and the output winding being connected in parallel with the source and the impedance.

4. An oscillatory system having, in combination, an electric circuit, an electromechanical vibrator having electrodes, there being a gap between the vibrator and the electrodes, means for connecting the electrodes with the circuit, and means for causing the system to oscillate and the vibrator to vibrate at a frequency at which the impedance of the vibrator is substantially purely resistive, said means comprising an inductance connected with the circuit and having a value such that the total reactance of the system, including the reactance of the gap, is substantially equal to zero at said frequency.

5. An oscillatory system having, in combination, an electric device having an internal capacity, an input circuit and an output circuit each having a winding, the windings being inductively coupled together, a source of energy in the output circuit, an impedance, and an electromechanical vibrator, the vibrator and the output winding being connected in parallel with the source and the impedance, the impedance being so low as to be insufficient for the production of oscillations by the feed-back of energy from the output circuit to the input circuit by way of the internal capacity of the electrical device.

6. An oscillatory system having, in combination, a vacuum tube having a filament, a grid and a plate, an input circuit in which the filament and the grid are connected, an output circuit in which the plate and the filament are connected, the input and the output circuits each having a resultant capacitance, means for preventing the feed back of energy from the output circuit into the input circuit through the tube, a piezo-electric crystal having electrodes, there being a gap between the crystal and the electrodes, means for connecting one of the electrodes to a point in the grid circuit and the other electrode to a point in the plate circuit, and an impedance connected in series with the crystal, the reactance of the impedance being equal and opposite to the sum of the reactances of the total input and output capacitances and the reactance of the gap at the time that the reaction of the crystal becomes purely resistive, whereby the system will oscillate and the crystal will vibrate at a natural frequency of mechanical vibration of the crystal.

7. An oscillatory system having, in combination, a vacuum tube having a filament, a grid and a plate, an input circuit in which the filament and the grid are connected, an output circuit in which the filament and the plate are connected, the input and the output circuits each being provided with a condenser having a resultant capacitance, the input-circuit condenser having a side connected to the filament and a side connected to the grid, the output-circuit condenser having a side connected to the filament and a side connected to the plate, a winding and an electromechanical vibrator connected as a combination in series and one terminal of the combination being connected to the grid side of the input-circuit condenser and the other terminal of the combination being connected to the plate side of the output-circuit condenser, the inductance of the winding being such as to cause the vibrator to vibrate at substantially an exact natural frequency of mechanical vibration of the vibrator.

8. An oscillatory system having, in combination, a vacuum tube having an input circuit and an output circuit, a piezo-electric crystal connected in the input circuit, the crystal having a reactance of value substantially equal to zero at the frequency of the oscillations of the system, and an inductance in the input circuit having a value such as, when combined with the reactance of the crystal, to render the total input reactance of sufficient magnitude to produce sustained oscillations in the system.

9. An oscillatory system having, in combination, vacuum-tube apparatus having an input circuit and an output circuit each provided with a condenser having a resultant capacitance, the condensers each having two terminals, one terminal of one condenser being connected with one terminal of the other condenser, and an electromechanical vibrator and an inductance connected as a combination in series, one terminal of the combination being connected to the other terminal of one condenser and the other terminal of the combination being connected to the other terminal of the other condenser, the inductance having a value such that it is in series resonance with the effective series reactance of the vacuum-tube apparatus, the input circuit and the output circuit at the frequency of the mechanical vibrations of the vibrator.

10. An oscillatory system having, in combination, a vacuum tube having a filament, a grid, a plate and a screening electrode, an input circuit in which the filament and the grid are connected, an output circuit in which the filament and the plate are connected, means including said screening electrode for shielding the grid from the plate to reduce undesired feed-back of energy from the output circuit to the input circuit through the tube, the input and the output circuits each being provided with a condenser having a resultant capacitance, the input-circuit condenser having a side connected with the filament and a side connected with the grid, the output circuit condenser having a side connected with the filament and a side connected with the plate, and an electromechanical vibrator and an inductance connected as a combination in series, one terminal of the combination being connected to the grid side of the input-circuit condenser and the other terminal of the combination being connected to the plate side of the output-circuit condenser, the inductance having a value such that it is in series resonance with the effective series reactance of the vacuum tube, the input circuit and the output circuit at the frequency of the mechanical vibrations of the vibrator.

11. An oscillatory system having, in combination, a vacuum tube having an input circuit and an output circuit, a piezo-electric crystal connected in the input circuit, and an inductance in series with the crystal and having a value such as to produce oscillations in the system at a frequency at which the phase angle between the voltage across the crystal and the current through the crystal is less than substantially forty-five degrees.

12. An oscillatory system having, in combination, a vacuum tube having an input circuit and an output circuit, a piezo-electric crystal connected in the input circuit, and an inductance in series with the crystal and having a value such as to produce oscillations in the system at a frequency at which the phase angle between the voltage across the crystal and the current through the crystal is substantially equal to zero.

13. An oscillatory system having, in combination, an electric circuit, a piezo-electric crystal, and means for causing the system to oscillate and the vibrator to vibrate at a frequency at which the reaction of the crystal is substantially purely resistive comprising an inductance connected in series with the crystal and having a value such that it is in series resonance with the effective series reactance of the circuit at the said frequency.

14. An oscillatory system having, in combination, vacuum-tube apparatus having an input circuit and an output circuit each provided with a condenser having a resultant capacitance, the condensers each having two terminals, one terminal of one condenser being connected with one terminal of the other condenser, and an electromechanical vibrator and an inductance connected as a combination in series, one terminal of the combination being connected to the other terminal of one condenser and the other terminal of the combination being connected to the other terminal of the other condenser, the inductance having a value such that it is in series resonance with the effective series reactance of the vacuum-tube apparatus, the input circuit and the output circuit at the frequency of the mechanical vibrations of the vibrator.

15. An oscillatory system having, in combination, a vacuum tube having a filament, a grid, a plate and a screening electrode, an input circuit in which the filament and the grid are connected, an output circuit in which the filament and the plate are connected, means including said screening electrode for shielding the grid from the plate to reduce undesired feed-back of energy from the output circuit to the input circuit through the tube, the input and the output circuits each being provided with a condenser having a resultant capacitance, the input-circuit condenser having a side connected with the filament and a side connected with the grid, the output circuit condenser having a side connected with the filament and a side connected with the plate, and an electromechanical vibrator and an inductance connected as a combination in series, one terminal of the combination being connected to the grid side of the input-circuit condenser and the other terminal of the combination being connected to the plate side of the output-circuit condenser.

16. An oscillatory system having, in combination, an electrical device having an internal capacity, an input circuit and an output circuit therefor inductively coupled together, an inductance in the output circuit, an electro-mechanical vibrator, and means connecting the electromechanical vibrator in the output circuit in series with the inductance, the output circuit having an impedance of value so low as to be insufficient for the production of oscillations by the feed-back of energy from the output circuit to the input circuit by way of the internal capacity of the electrical device.

17. An oscillatory system having, in combination, a vacuum tube having an input circuit and an output circuit, a piezo-electric crystal, means connecting the crystal with the tube, and an inductance in series with the crystal and having a value such as to produce oscillations in the system at a frequency at which the phase-angle between the voltage across the crystal and the current through the crystal is less than substantially forty-five degrees.

18. An oscillatory system having, in combination, an electric circuit, a piezo-electric crystal, and means connecting the electric circuit and the crystal together to cause the system to oscillate and the crystal to vibrate at a frequency at which the phase angle between the voltage across the crystal and the current through the crystal is less than substantially forty-five degrees.

19. An oscillatory system having, in combination, vacuum-tube apparatus having an input circuit and an output circuit each provided with a condenser having a resultant capacitance, the condensers each having two terminals, one terminal of one condenser being connected with one terminal of the other condenser, and an electromechanical vibrator and an inductance connected as a combination in series, one terminal of the combination being connected to the other terminal of one condenser and the other terminal of the combination being connected to the other terminal of the other condenser

JAMES K. CLAPP.